US 6,665,764 B2

United States Patent
Wurzburg

(10) Patent No.: US 6,665,764 B2
(45) Date of Patent: Dec. 16, 2003

(54) HUBLESS DOCKING STATION HAVING USB PORTS

(75) Inventor: Henry Wurzburg, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 201 days.

(21) Appl. No.: 09/999,653

(22) Filed: Oct. 25, 2001

(65) Prior Publication Data

US 2003/0084222 A1 May 1, 2003

(51) Int. Cl.[7] .............................. G06F 13/00; H05K 7/10
(52) U.S. Cl. ....................... 710/303; 710/300; 710/301; 710/302; 710/304
(58) Field of Search ................................. 710/303, 304, 710/300, 301, 302

(56) References Cited

U.S. PATENT DOCUMENTS

| | | | |
|---|---|---|---|
| 5,890,015 A | | 3/1999 | Garney et al. |
| 6,000,042 A | * | 12/1999 | Henrie ........................ 714/40 |
| 6,125,455 A | * | 9/2000 | Yeo .............................. 714/14 |
| 6,141,221 A | * | 10/2000 | Tong et al. .................. 361/724 |
| 6,147,682 A | * | 11/2000 | Kim .......................... 345/211 |
| 6,178,514 B1 | * | 1/2001 | Wood ........................ 713/300 |
| 6,363,491 B1 | | 3/2002 | Endo |
| 6,449,142 B1 | | 9/2002 | Wu |
| 6,466,434 B1 | * | 10/2002 | Tsai ............................. 361/685 |
| 6,516,418 B1 | * | 2/2003 | Lee ............................. 713/320 |
| 6,532,512 B1 | * | 3/2003 | Torii et al. .................. 710/316 |
| 6,549,966 B1 | * | 4/2003 | Dickens et al. ............. 710/300 |

* cited by examiner

Primary Examiner—Tim Vo
(74) Attorney, Agent, or Firm—Meyertons Hood Kivlin Kowert & Goetzel, P.C.; Jeffrey C. Hood

(57) ABSTRACT

A hub-less docking station for providing additional universal serial bus (USB). In one embodiment, a docking station includes a docking connector and a plurality of USB jacks. The docking connector is configured to allow a portable computer to be coupled to the docking station, while the USB jacks are configured for coupling to USB peripherals. The portable computer includes a USB controller for supporting a plurality of USB ports. Signal pins from the USB controller are coupled to the USB jacks through the docking connector. Power signals and current sense signals are multiplexed by a multiplexer in the portable computer, and are de-multiplexed by a de-multiplexer in the docking station. The de-multiplexed power and current sense signals are provided to the USB jacks. The docking station is thus able to provide a plurality of additional USB ports to the portable computer, when docked, without the use of a USB hub.

19 Claims, 3 Drawing Sheets

HUBLESS DOCKING STATION HAVING USB PORTS

BACKGROUND OF THE INVENTION

1. Field of the Invention

This invention relates to docking stations for portable computers, and more particularly, to peripheral interfaces within a docking station.

2. Description of the Related Art

The demand for new features and the ability to easily connect peripheral devices to computer systems has led to several new developments in computer systems in recent years. One such development is the Universal Serial Bus (USB). The USB specification was developed in order to provide an external expansion bus which allowed peripheral devices to be added with the same ease as connecting a telephone to a wall jack. Since its introduction, USB has enjoyed widespread acceptance in the marketplace.

As the name implies, USB is a serial bus. A USB peripheral may be easily connected to a computer system by simply plugging its connector into the jack of a USB port. The host computer system may then detect the presence of the newly added peripheral coupled to the USB port. Following detection of the peripheral device, the host computer may then read identification and configuration information from the device, and assign it a unique address for run-time data transfers. The peripheral device may then be ready for operation. In many cases, the only end-user intervention required to make the peripheral device ready for operation is the plugging in of its connector into the USB port.

Because of the ease of connecting USB peripherals, it is often desired to expand the number of USB ports in a computer system. The additional USB ports may be easily provided by a USB hub. FIG. 1 is a block diagram of one embodiment of a computer system having additional USB ports provide by a hub. In the embodiment shown, computer system 100 includes a single USB port, designated as USB port 0. As it may be desirable to connect multiple USB peripherals to computer system 100, USB hub 104 is connected to USB port 0. USB hub 104 includes three additional USB ports, port 1, port 2, port 3, and repeater 104R. Repeater 104R may repeat (i.e. amplify) USB signals being transmitted to or from a peripheral device. Such signals may include both data signals, as well as power signals. Thus, computer system 100 is able to accommodate three USB peripheral devices due to the use of USB hub 104. It should also be noted that additional peripheral devices may be connected to computer system 100 by connecting a second USB hub to the one shown in the drawing.

As the USB standard has increased in popularity, USB controllers for computer systems have been designed to accommodate multiple USB ports. Thus, additional USB ports may be built into the system by simply adding additional USB jacks. While this solution may work well for stationary computer systems (e.g. a desktop computer), it may not be practical for portable computers (i.e. laptops/notebooks). Since a portable computer may be limited in the amount of available physical space, it may not be possible to build additional USB ports into the system. This may be true despite the fact that the USB controller within the system is capable of supporting additional USB ports.

One way in which a portable computer may be able to utilize additional USB ports is through a docking station. However, the docking station must include a hub in order for the portable computer to realize additional USB ports. Placing a hub in a docking station may be more expensive than utilizing the capacity for additional ports provided by the USB controller in the portable computer system. However, due to the physical limitations of the portable computer, it may be necessary to use a docking station with a hub in order to gain access to additional USB ports.

SUMMARY OF THE INVENTION

A hub-less docking station for providing additional universal serial bus (USB) ports to a portable computer is disclosed. In one embodiment, a docking station includes a docking connector and a plurality of USB jacks. The docking connector is configured to allow a portable computer to be coupled to the docking station, while the USB jacks are configured for coupling to USB peripherals. The portable computer includes a USB controller configured for supporting a plurality of USB ports. Signal pins from the USB controller are coupled to the USB jacks through the docking connector. Power signals and current sense signals are each multiplexed by a multiplexer in the portable computer, and are each de-multiplexed by a de-multiplexer in the docking station. The de-multiplexed power and current sense signals are provided to the USB jacks. The docking station is thus able to provide a plurality of additional USB ports to the portable computer, when docked, without the use of a USB hub.

The USB controller in the portable computer may be configured to support the USB 2.0 standard, and may also be backward compatible to support the USB 1.1 standard. Embodiments that support future standards of USB are also possible and contemplated. When the portable computer is coupled to the docking station, the host controller may support both those ports that are implemented by connecting to the docking station, as well as any USB ports in the portable computer itself. Thus, the portable computer and the docking station may implement a system having several USB supported only by the USB controller within the portable computer. A repeater or an additional USB controller may not be required in order to implement the additional USB ports in the docking station.

BRIEF DESCRIPTION OF THE DRAWINGS

Other aspects of the invention will become apparent upon reading the following detailed description and upon reference to the accompanying drawings in which.

Figure 1:
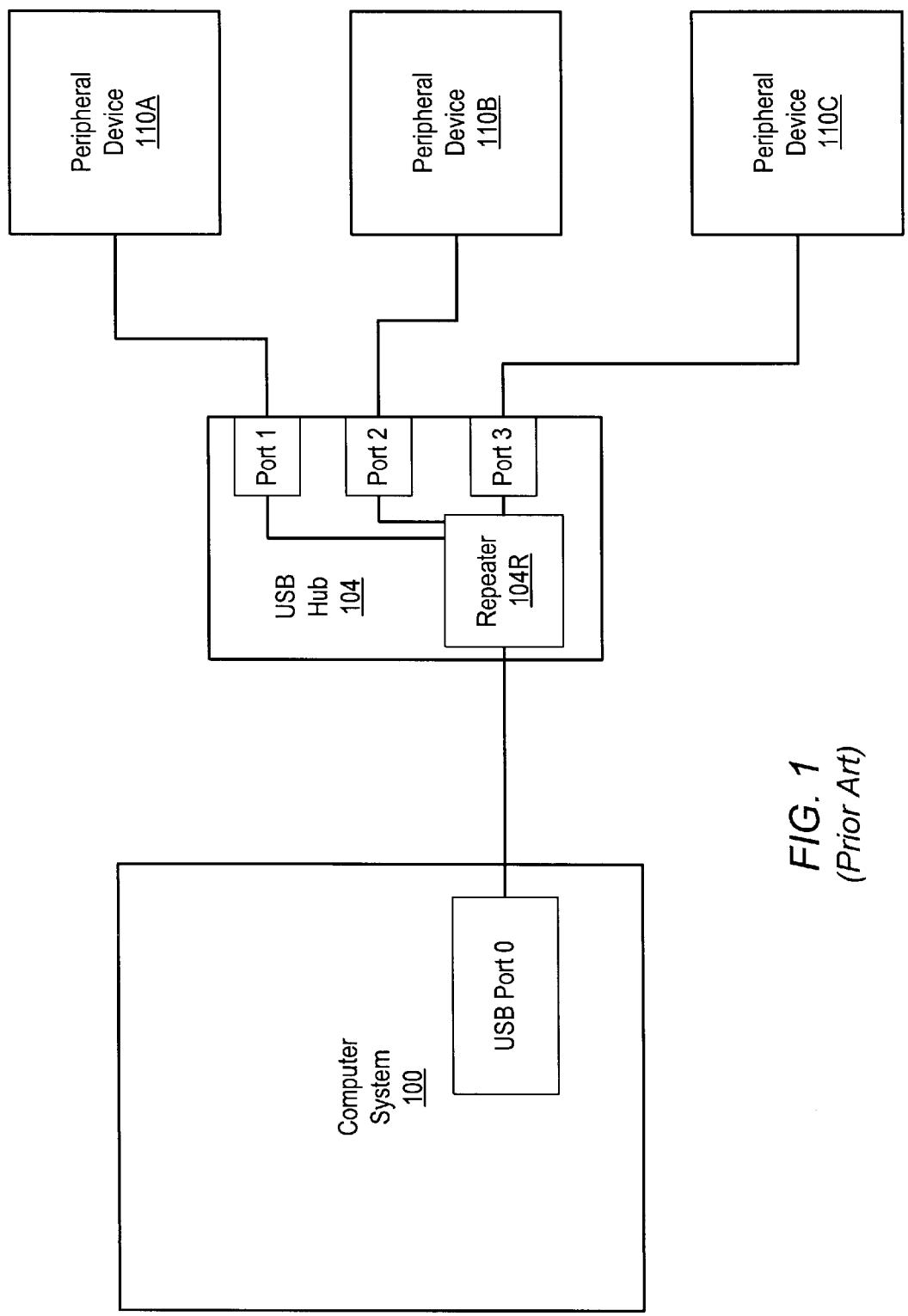
FIG. 1 (Prior Art) is a block diagram of a computer system having peripheral devices coupled to multiple USB ports provided by a USB hub.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Figure 2:
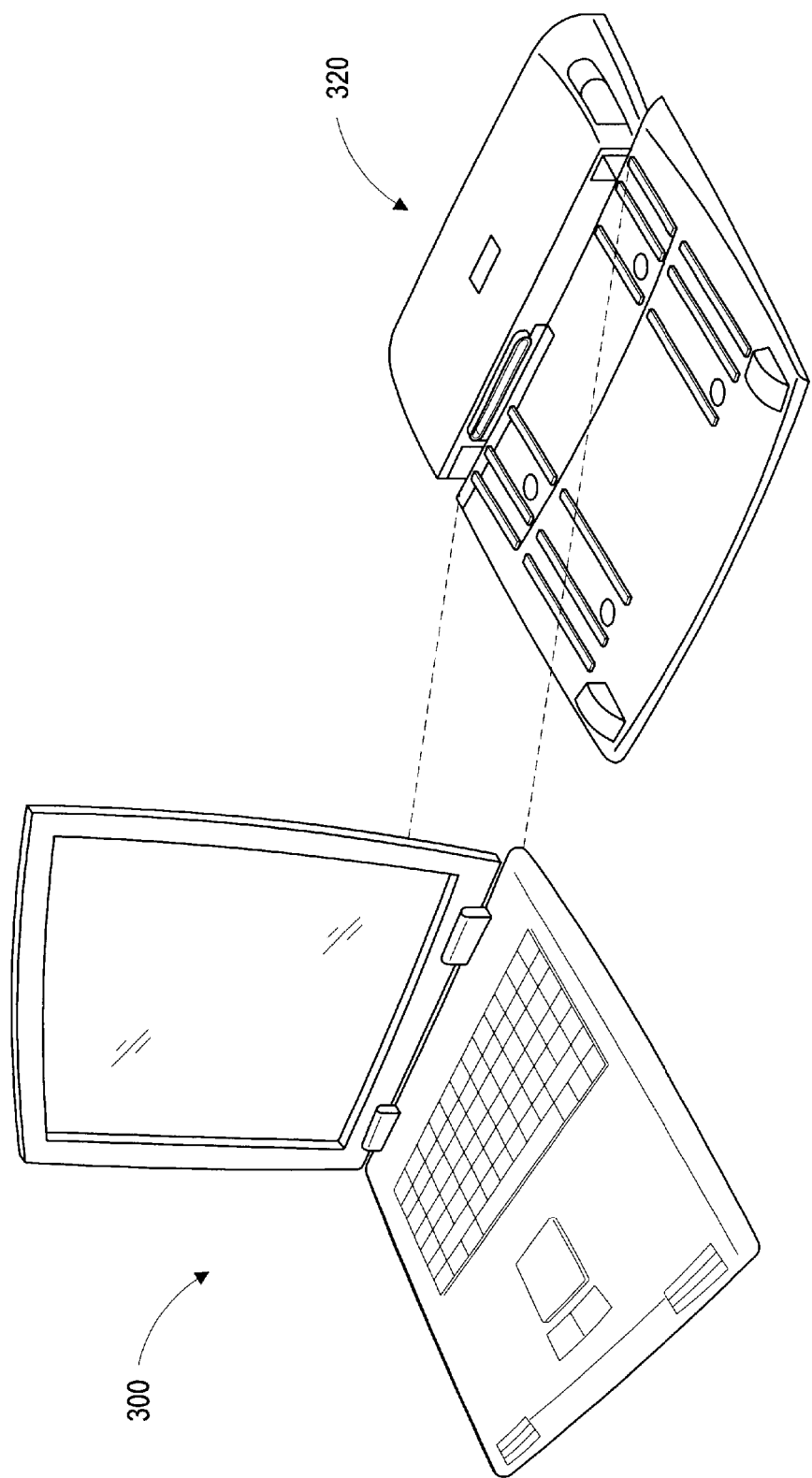
FIG. 2 is a drawing of one embodiment of a portable computer and a docking station.

FIG. 2 is a drawing of one embodiment of a portable computer and a docking station. Portable computer 300 may be one of many different types of portable computers (i.e. laptops, notebooks, etc.). Furthermore, it is possible and contemplated that portable computer 300 may be another type of device, such as a personal digital assistant (PDA).

Docking station 320 may provide additional functionality to portable computer 300. Docking station 320 may include connections for a full-size keyboard, a monitor, a printer, and various peripheral devices. Various types of peripheral device interfaces may be employed, including universal serial bus (USB), peripheral component interconnect (PCI), and so on. Although portable computer 300 may include some of these types interfaces, docking station 320 may provide additional interfaces, thereby expanding the capability of the portable computer.

Docking station 320 may provide additional USB ports without requiring the use of a USB hub. The additional USB ports of docking station 320 may utilize the functionality of a USB controller in portable computer 300. The USB controller within portable computer 300 may be configured to provide signal connections for several USB ports, as well as the requisite power and current sense signals. By allowing docking station 320 to utilize a USB controller in portable computer 300, the need for a USB hub to provide additional USB ports may be eliminated. This may result in additional functionality being available to portable computer 300 without the extra expense of the USB hub.

Figure 3:
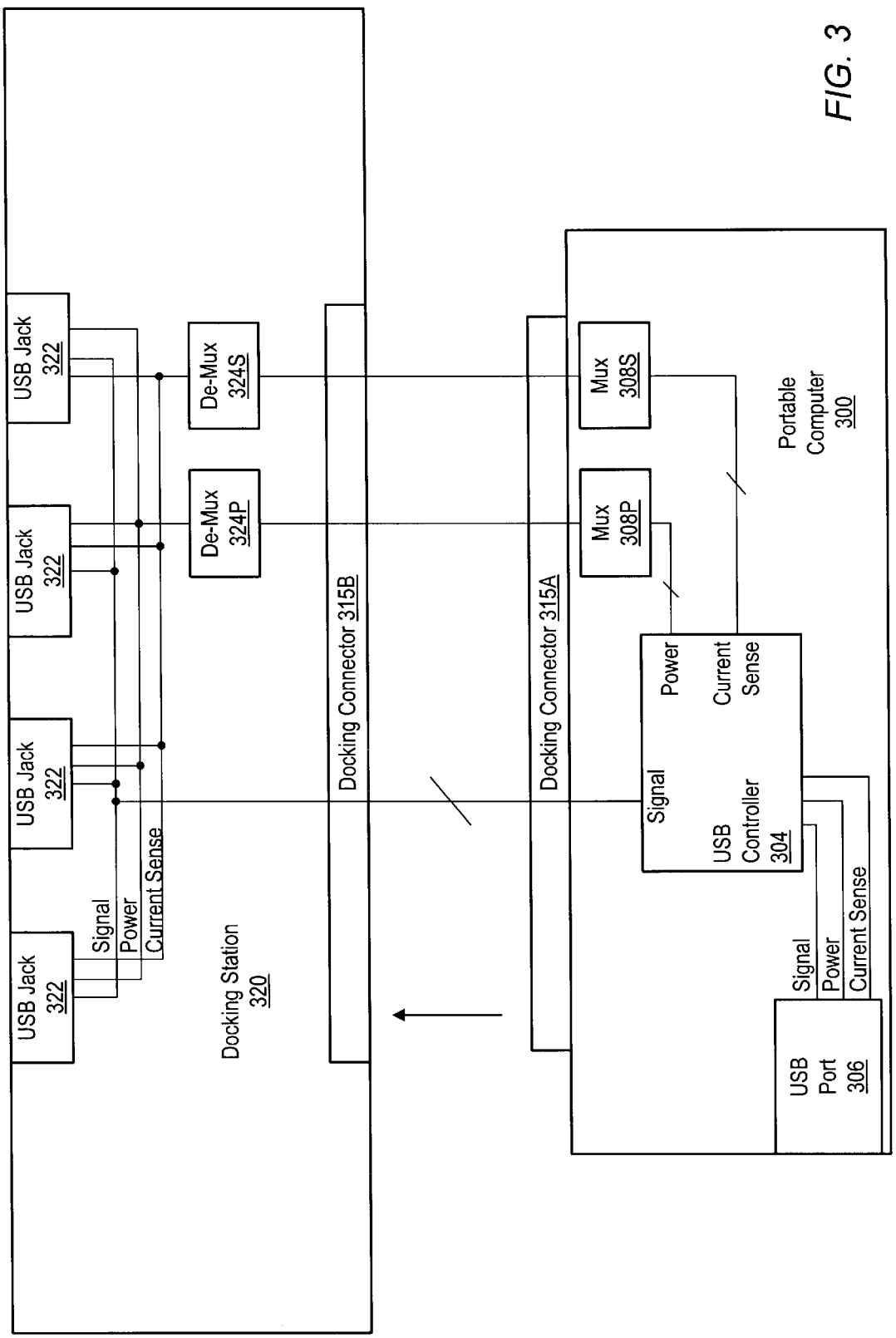
FIG. 3 is a block diagram of a hub-less docking station for a portable computer, wherein the hub-less docking station provides additional USB ports.

Moving now to FIG. 3, a block diagram of a portable computer 300 and a hub-less docking station 320 is shown. Portable computer 300 may be coupled to docking station 320 through docking connectors 315A (of portable computer 300) and 315B (of docking station 320). Docking connectors 315A and 315B may be complementary connectors. Portable computer 300 includes USB controller 304, which may be configured to support a plurality of USB ports. USB controller may be configured to support USB standard 2.0, standard 1.1, or both. Embodiments are also contemplated in which future USB standards are supported. Portable computer 300 may include at least one USB port 306, even though USB controller 304 may support additional USB ports. Signal pins for the additional USB ports that may be supported by USB controller may be connected to docking connector 315A. Power and current sense pins for each of the additional USB ports may be connected to the inputs of multiplexers 308P and 308S. Multiplexer 308P may be configured for multiplexing power signals, while multiplexer 308S may be configured for multiplexing current sense signals. The output of multiplexers 308P and 308S maybe coupled to docking connector 315A.

Docking station 320 includes a plurality of USB jacks 322. Each USB jack 322 may include connections for signal, power, and current sensing. Signal connections for each USB jack 322 are coupled through de-multiplexer blocks 324P and 324S to docking connector 315B of docking station 320. These signal connections may be coupled to USB controller 304 when portable computer 300 is coupled to docking station 320. USB jacks 322 may also receive power from the outputs of de-multiplexer 324P. Similarly, each USB jack 322 may receive current sense signals from the output of de-multiplexer 324S. It should be noted that in some embodiments, power and current sensing may be provided by circuitry that is separate from USB controller 304.

When portable computer 300 is coupled to docking station 320 via docking connectors 315A and 315B, USB controller 304 provides signals to docking station 320 through docking connectors 315A and 315B, multiplexers 308P and 308S, and de-multiplexers 324P and 324S. The signal connections may be terminated at USB jacks 322. Thus, USB jacks 322 may provide additional USB ports to the portable computer 300. The additional USB ports are supported by USB controller 304, from which signal, power, and current sense connections are provided to USB jacks 322. Thus, a USB peripheral may be coupled to any of the USB jacks 322. In addition, portable computer 300 includes a USB port 306 that may also be used for coupling to a USB peripheral. Each USB port may be controlled by USB controller 304. Thus, the combination of portable computer 300 and docking station 320 may provide several USB ports without the use of a USB hub. Furthermore, since a hub is not required, all USB ports in the computer/docking station combination may be utilized by USB peripheral devices, and thereby allow full utilization of USB controller 304.

Virtually any type of USB device may be coupled to portable computer 300 through one of the USB ports in docking station 320 (as well as through the USB port on portable computer 300). Examples of such devices include printers, scanners, storage devices, CD drives, digital cameras, and so forth. Thus, the functionality of portable computer 300 may be greatly expanded by docking station 320 and the additional USB ports provided therein.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A docking station comprising:
   a docking connector configured for coupling the docking station to a portable computer;
   a plurality of universal serial bus (USB) jacks;
   a de-multiplexer, wherein the de-multiplexer is configured to receive a multiplexed power signal from the portable computer, and wherein the de-multiplexer is further configured to provide power signals to each of the plurality of USB jacks via the de-multiplexer output;
   a plurality of signal connections each coupled to one of the USB jacks and further coupled to the docking connector; and
   wherein the docking station is configured to provide a plurality of USB ports though the USB jacks when the portable computer is coupled to the docking station.

2. The docking station as recited in claim 1, wherein the portable computer includes a USB controller, wherein the USB controller is configured to support a plurality of USB ports.

3. The docking station as recited in claim 1, wherein the docking station is further configured to receive a multiplexed current sense signal, and wherein the de-multiplexer is further configured to provide current sense signals to each of the plurality of USB jacks.

4. The docking station as recited in claim 1, wherein the portable computer includes a USB port separate from the plurality of USB ports.

5. The docking station as recited in claim 2, wherein the USB controller is configured to support the USB 2.0 standard.

6. The docking station as recited in claim 5, wherein the USB controller is further configured to support the USB 1.1 standard.

7. A method for providing additional universal serial bus (USB) ports to a portable computer, the method comprising:
provide a docking station, the docking station configured for coupling to a portable computer, wherein the docking station includes a plurality of USB jacks;
providing a portable computer, wherein the portable computer is configured for connecting to the docking station at a docking connector, and wherein the portable computer includes a USB controller, the USB controller configured for supporting a plurality of USB ports;
connecting signal pins from the USB controller to each of the plurality of USB jacks, wherein said connecting is performed by coupling the portable computer to the docking station using the docking connector;
multiplexing a plurality of power signals from the USB controller, wherein said multiplexing is performed by the portable computer; and
de-multiplexing the plurality of power signals from the USB controller, wherein said de-multiplexing is performed by the docking station, and wherein one of each of the plurality of power signals is provided to one of each of the plurality of USB jacks.

8. The method as recited in claim 7 further comprising the portable computer multiplexing a plurality of current sense signals and the docking station de-multiplexing the plurality of current sense signals, wherein one of each of the current sense signals is provided to one of each of the plurality of USB jacks.

9. The method as recited in claim 7, wherein the USB controller is configured to support the USB 2.0 standard.

10. The method as recited in claim 9, wherein the USB controller is configured to support the USB 1.1 standard.

11. A system comprising:
a portable computer, wherein the portable computer includes:
a universal serial bus (USB) controller, wherein the USB controller includes signal pins and power pins for a plurality of USB ports; and
a first multiplexer, wherein inputs to the first multiplexer are coupled to the power pins of the USB controller; and
a docking station, wherein the docking station includes:
a docking connector for coupling the portable computer to the docking station;
a plurality of USB jacks;
a plurality of connectors configured for coupling the each of the signal pins from the portable computer to one of the plurality of USB jacks; and
a first de-multiplexer, wherein the input to the first de-multiplexer is configured to be coupled to the output of the first multiplexer, wherein each of the outputs of the first multiplexer are coupled to one of the plurality of USB jacks.

12. The system as recited in claim 11, wherein the docking station is configured to provide a plurality of USB ports when the portable computer is coupled to the docking station.

13. The system as recited in claim 11, wherein the first multiplexer is configured to output a multiplexed power signal, and wherein the first de-multiplexer is configured to receive the multiplexed power signal.

14. The system as recited in claim 11 further comprising a second multiplexer in the portable computer and a second de-multiplexer in the docking station.

15. The system as recited in claim 11, wherein the second multiplexer is configured to output a multiplexed current sense signal, and wherein the second de-multiplexer is configured to output a plurality of current sense signals, wherein each of the plurality of USB jacks is configured to receive one of each of the plurality of current sense signals.

16. The system as recited in claim 11, wherein the USB controller is configured to support the USB 2.0 standard.

17. The system as recited in claim 11, wherein the USB controller is configured to support the USB 1.1 standard.

18. The system as recited in claim 12, wherein the portable computer includes a USB port separate from the plurality of USB ports.

19. The system as recited in claim 13, wherein the first de-multiplexer is configured to output a plurality of power signals, wherein each of the plurality of USB jacks is configured to receive one of each of the plurality of power signals.

* * * * *